(12) United States Patent
Yamamoto et al.

(10) Patent No.: US 10,413,831 B2
(45) Date of Patent: Sep. 17, 2019

(54) GAME SYSTEM, AND CONTROL METHOD AND STORAGE MEDIUM USED IN SAME

(71) Applicant: Konami Digital Entertainment Co., Ltd., Minato-ku, Tokyo (JP)

(72) Inventors: Takao Yamamoto, Minato-ku (JP); Shota Katagiri, Minato-ku (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 263 days.

(21) Appl. No.: 15/417,755

(22) Filed: Jan. 27, 2017

(65) Prior Publication Data

US 2017/0136363 A1 May 18, 2017

Related U.S. Application Data

(63) Continuation of application No. PCT/JP2015/065652, filed on May 29, 2015.

(30) Foreign Application Priority Data

Jul. 31, 2014 (JP) .................................. 2014-156642

(51) Int. Cl.
*A63F 13/67* (2014.01)
*A63F 13/814* (2014.01)
(Continued)

(52) U.S. Cl.
CPC .............. *A63F 13/67* (2014.09); *A63F 13/46* (2014.09); *A63F 13/69* (2014.09); *A63F 13/798* (2014.09); *A63F 13/814* (2014.09)

(58) Field of Classification Search
None
See application file for complete search history.

(56) References Cited

U.S. PATENT DOCUMENTS

| 6,342,665 B1* | 1/2002 | Okita | A63F 13/005 |
| | | | 84/609 |
| 2003/0129576 A1* | 7/2003 | Wood | G06Q 30/02 |
| | | | 434/362 |
| 2011/0207513 A1* | 8/2011 | Cross | G10H 1/368 |
| | | | 463/7 |

FOREIGN PATENT DOCUMENTS

| JP | 2003-290543 A | 10/2003 |
| JP | 2006-288728 A | 10/2006 |
| JP | 2014-097169 A | 5/2014 |

OTHER PUBLICATIONS

Notification of Reason for Refusal (KR Patent Application No. 10-2017-7001823); Dispatch Date: May 18, 2018; Includes English Translation.

(Continued)

*Primary Examiner* — Kevin Y Kim
(74) *Attorney, Agent, or Firm* — Howard & Howard Attorneys PLLC

(57) ABSTRACT

A game system is provided that is capable of setting appropriate classifications for various musical pieces. This game system provides a music game in which each of musical pieces for which a level of difficulty is set is prepared as a play subject. The game system offers a chance of certification match in which musical pieces are supplied for each rank classification that is set for each musical piece with reference to the level of difficulty. And the game system acquires achievement information related to the clearing rate for each musical piece for each rank classification, such as the play results of certification matches and so on, and, on the basis of these acquired results, changes each rank classification to which each musical piece belongs with reference to this achievement information.

11 Claims, 12 Drawing Sheets

(51) Int. Cl.
     *A63F 13/46*        (2014.01)
     *A63F 13/798*     (2014.01)
     *A63F 13/69*        (2014.01)

(56) References Cited

OTHER PUBLICATIONS

Grant of Patent (KR Patent Application No. 10-2017-7001823); Dispatch Date: Nov. 23, 2018; 2 pages; Includes English Translation.
International Search Report (English and Japanese), International Application No. PCT/JP2015/065652, dated Aug. 4, 2015.
Written Opinion (English and Japanese), International Application No. PCT/JP2015/065652, dated Aug. 4, 2015.
Notification of Reasons for Refusal (English and Japanese), Patent Application No. 2014-156642, Date of Drafting: Nov. 6, 2015.
Decision to Grant a Petition (English and Japanese), Patent Application No. 2014-156642, Date of Drafting: Mar. 18, 2016.
First Office Action (CN Application No. 201580035010.1); dated Jan. 25, 2019; Includes English Translation; 15 pages.
The Second Office Action (CN Application or Publication No. 201580035010.1): dated Jun. 28, 2019; Includes English Translation; 10 pages.

\* cited by examiner

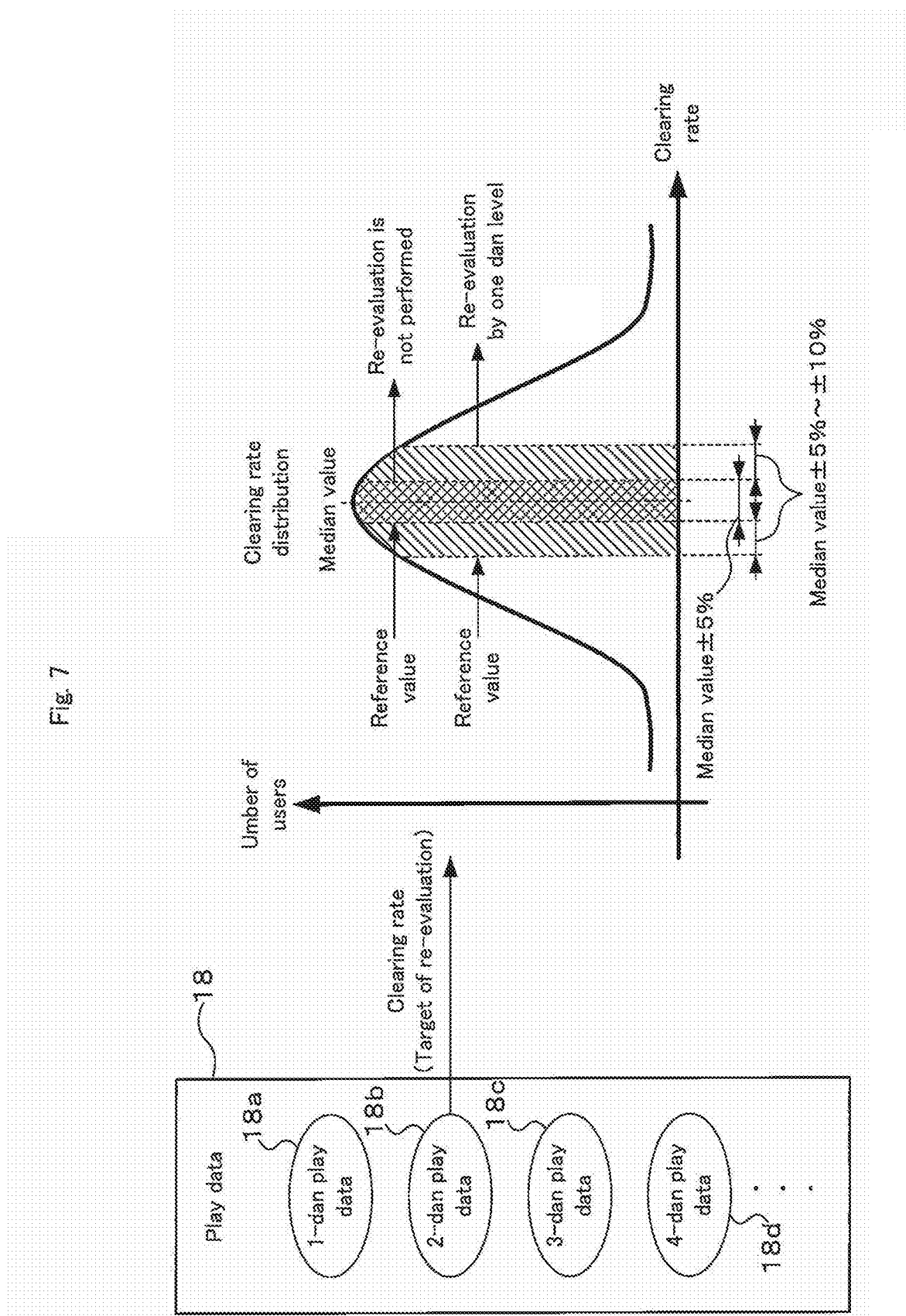

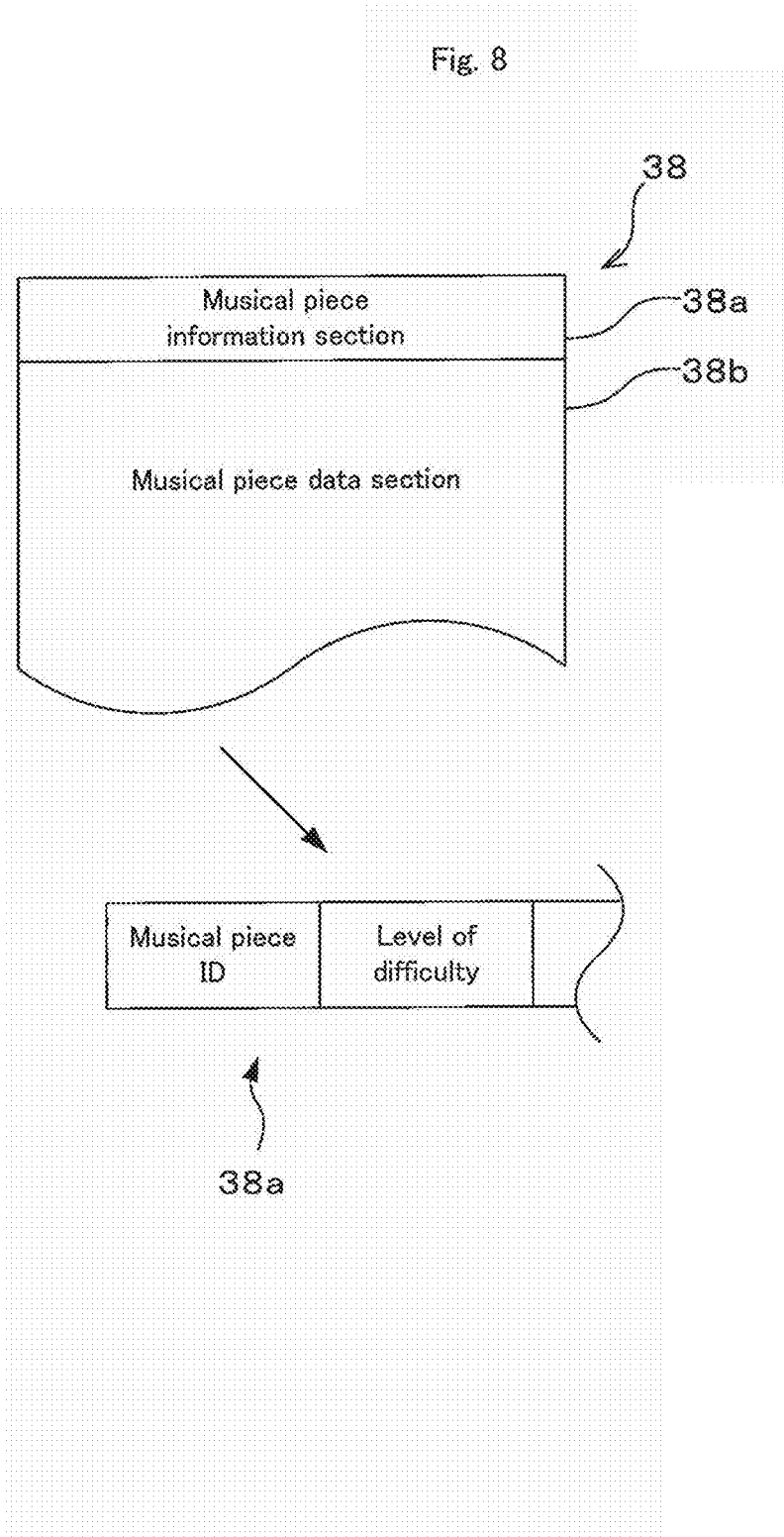

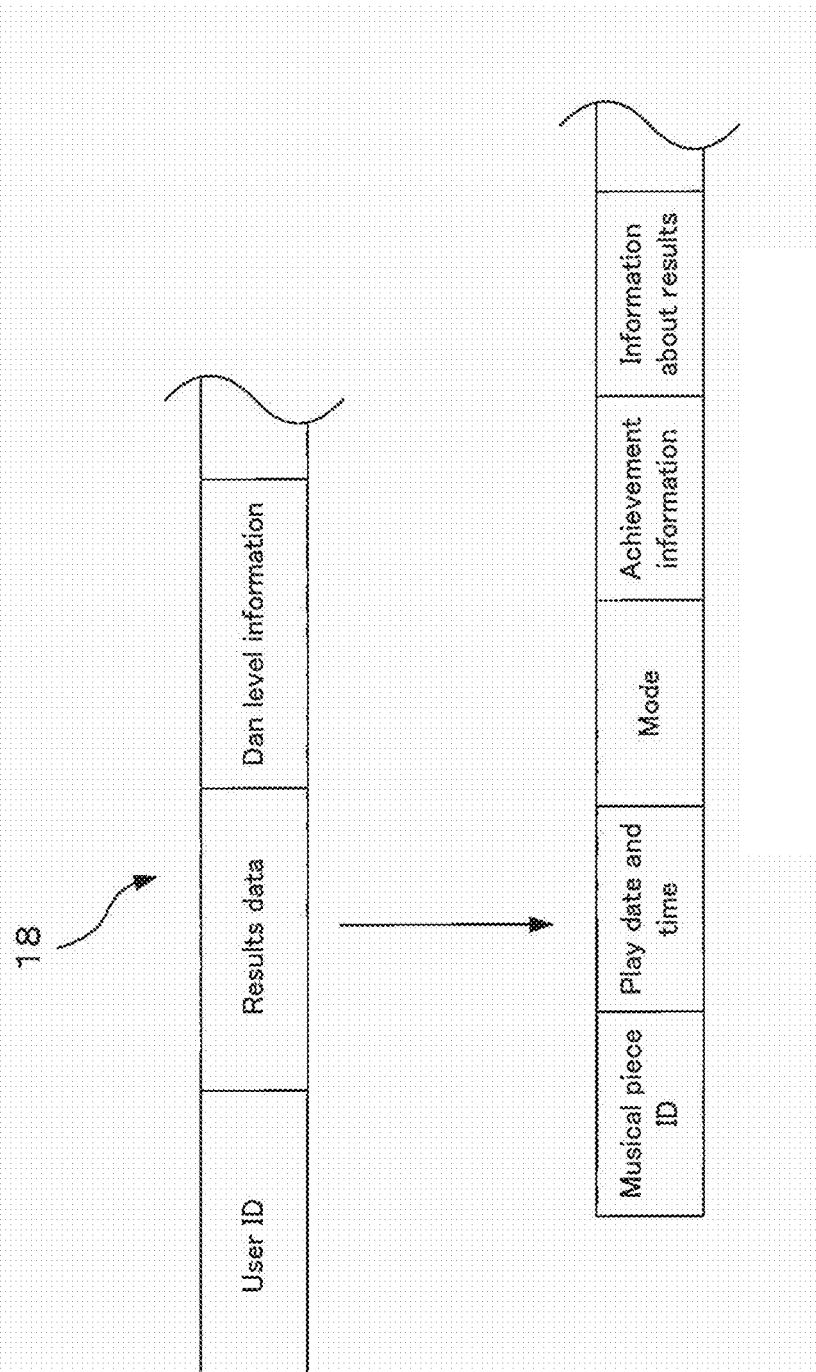

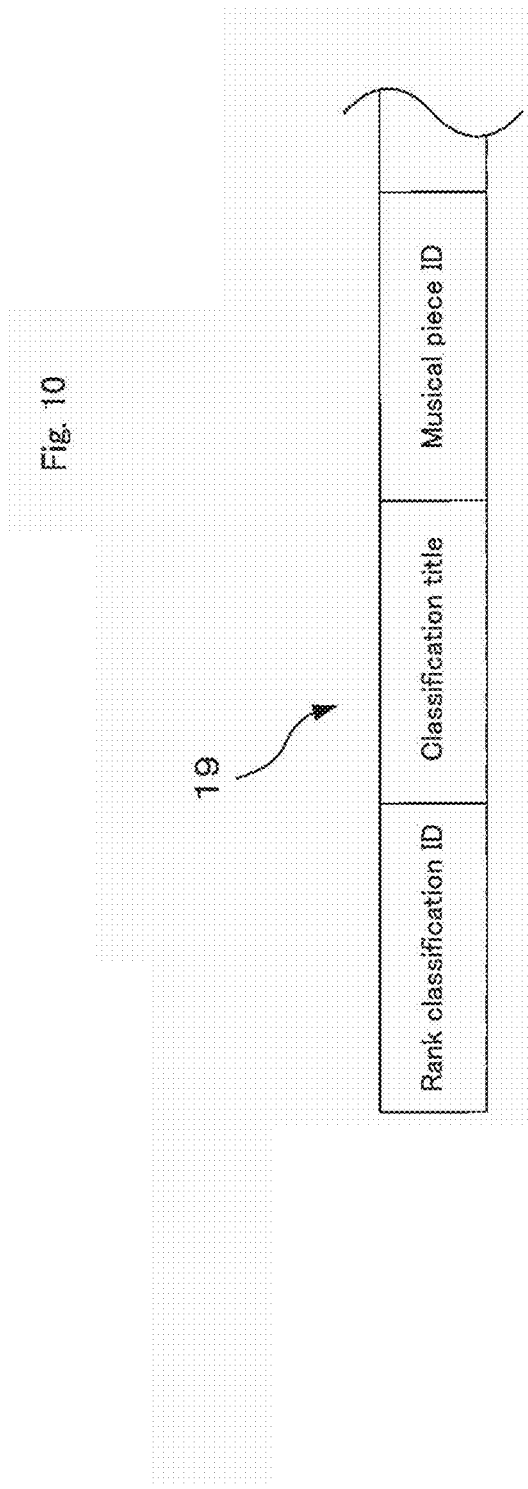

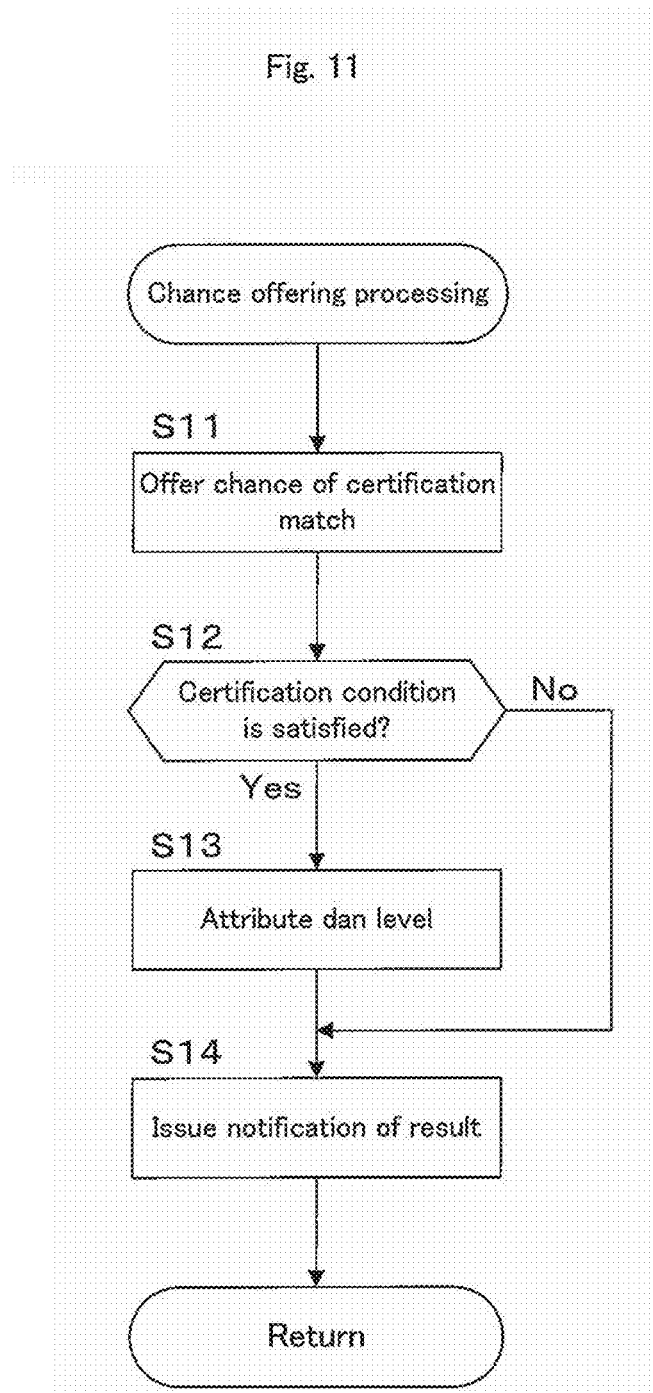

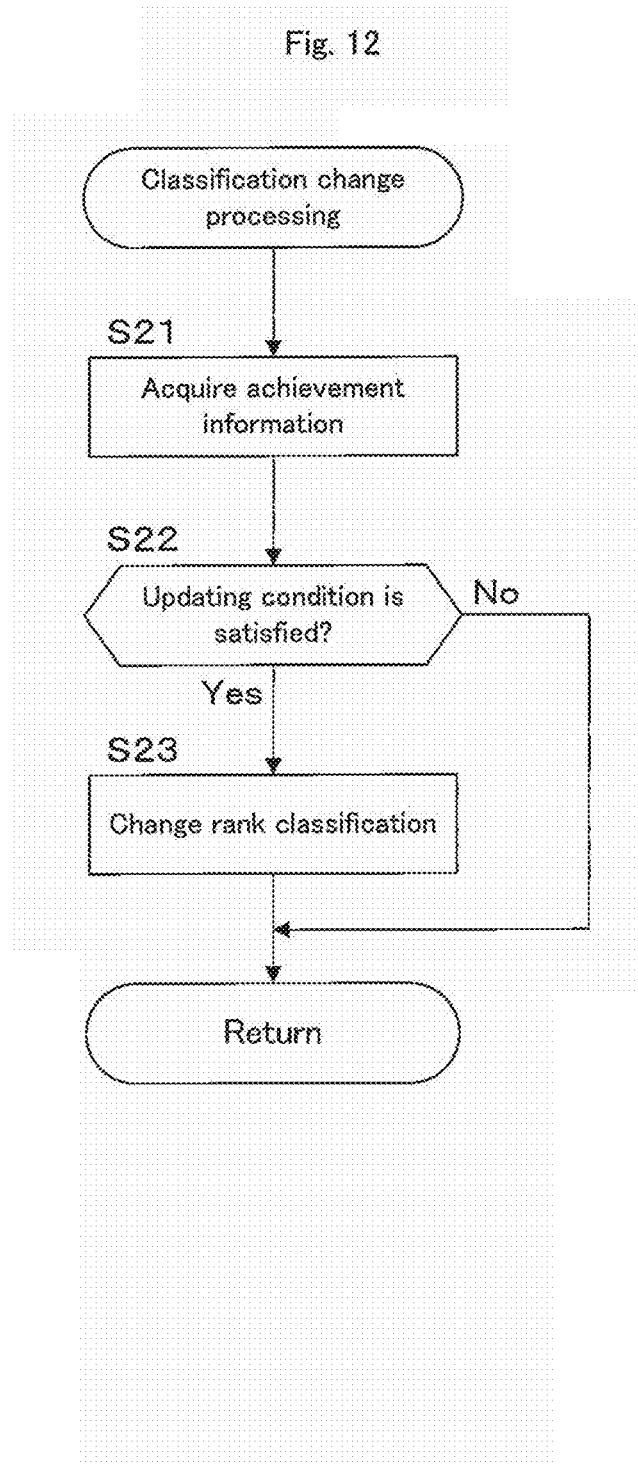

GAME SYSTEM, AND CONTROL METHOD AND STORAGE MEDIUM USED IN SAME

CROSS-REFERENCE TO RELATED APPLICATION

This application is a continuation of PCT Application No. PCT/JP2015/065652, filed May 29, 2015, which claims priority to Japanese Patent Application No. 2014-156642, filed Jul. 31, 2014, the disclosures of which are hereby incorporated by reference in their entirety.

TECHNICAL FIELD

The present invention relates to a game system and so on, providing a game in which each challenge for which a level of difficulty is set is prepared as a subject for play.

BACKGROUND ART

Games exist in which each challenge for which a level of difficulty is set is prepared as a subject for play. As one example, a game system is per se known (for example, refer to Patent Document #1) that provides a music game in which musical pieces are utilized as challenges, and in which the timings of execution of play actions that are executed in correspondence to these musical pieces are evaluated. Apart from the above, Patent Document #2 in the Citation List is considered to have some connection with the present invention.

CITATION LIST

Patent Literature

Patent Document #1: Japanese Laid Open Patent Publication 2003-290543.
Patent Document #2: Japanese Laid Open Patent Publication 2006-288728.

SUMMARY OF INVENTION

Technical Problem

With the game system of Patent Document #1, the level of difficulty of each musical piece is updated on the basis of game results. In other words, the level of difficulty itself of a musical piece is re-evaluated on the basis of game results. However, classifications are not set as reference for the difficulty of each musical piece. Accordingly, for example, the musical pieces are not supplied in units of categories, and naturally re-evaluation of the categories to which the various musical pieces belong is not performed. On the other hand, in Patent Document #2, musical pieces that are not used frequently are replaced with musical pieces that are more popular. However, in Patent Document #2, degrees of difficulty are not set for the musical pieces, and the musical pieces are not divided into categories based upon their levels of difficulty. Accordingly, likewise, musical pieces are not supplied in units of classification according to their level of difficulty.

Accordingly, the object of the present invention is to supply a game system and so on, that can set an appropriate classification for each musical piece.

Solution to Technical Problem

The game system of the present invention is a game system that provides a game in which each challenge for which a level of difficulty is set is prepared as a subject for play, wherein the game system comprises: a chance offering device configured to offer a challenge supply chance of supplying challenges for each classification that is established for each challenge based upon the level of difficulty; a result information acquisition device configured to acquire information about results of playing the challenges for each classification; and a classification change device configured to, based upon the results acquired by the result information acquisition device, change each classification to which each challenge belongs with reference to the results of playing.

The control method of the present invention is a control method that causes a computer installed in a game system that provides a game in which each challenge for which a level of difficulty is set is prepared as a subject of play to execute: a chance offering procedure of offering a challenge supply chance of supplying challenges for each classification that is established for each challenge based upon the level of difficulty; a result information acquisition procedure of acquiring information about results of playing the challenges for each classification; and a classification change procedure of, based upon the results acquired by the result information acquisition procedure, changing each classification to which each challenge belongs with reference to the results of playing.

And a non-transitory computer readable storage medium storing a the computer program for a game system according to the present invention is built so as to cause a computer installed in a game system that provides a game in which each challenge for which a level of difficulty is set is prepared as a subject of play to function as: a chance offering device configured to offer a challenge supply chance of supplying challenges for each classification that is established for each challenge based upon the level of difficulty; a result information acquisition device configured to acquire information about results of playing the challenges for each classification; and a classification change device configured to, based upon the results acquired by the result information acquisition device, change each classification to which each challenge belongs with reference to the results of playing.

BRIEF DESCRIPTION OF DRAWINGS

FIG. 7 is an explanatory figure for explanation of an example of a case in which the median value of a clearing rate is used in re-evaluation;

FIG. 8 is an explanatory figure for explanation of an example of the contents of musical piece data;

FIG. 9 is a figure showing an example of the contents of play data;

FIG. 10 is a figure showing an example of the contents of challenge setting data;

FIG. 11 is a figure showing an example of a chance offering processing routine flow chart; and FIG. 12 is a figure showing an example of a classification change processing routine flow chart.

DESCRIPTION OF EMBODIMENTS

Figure 1:
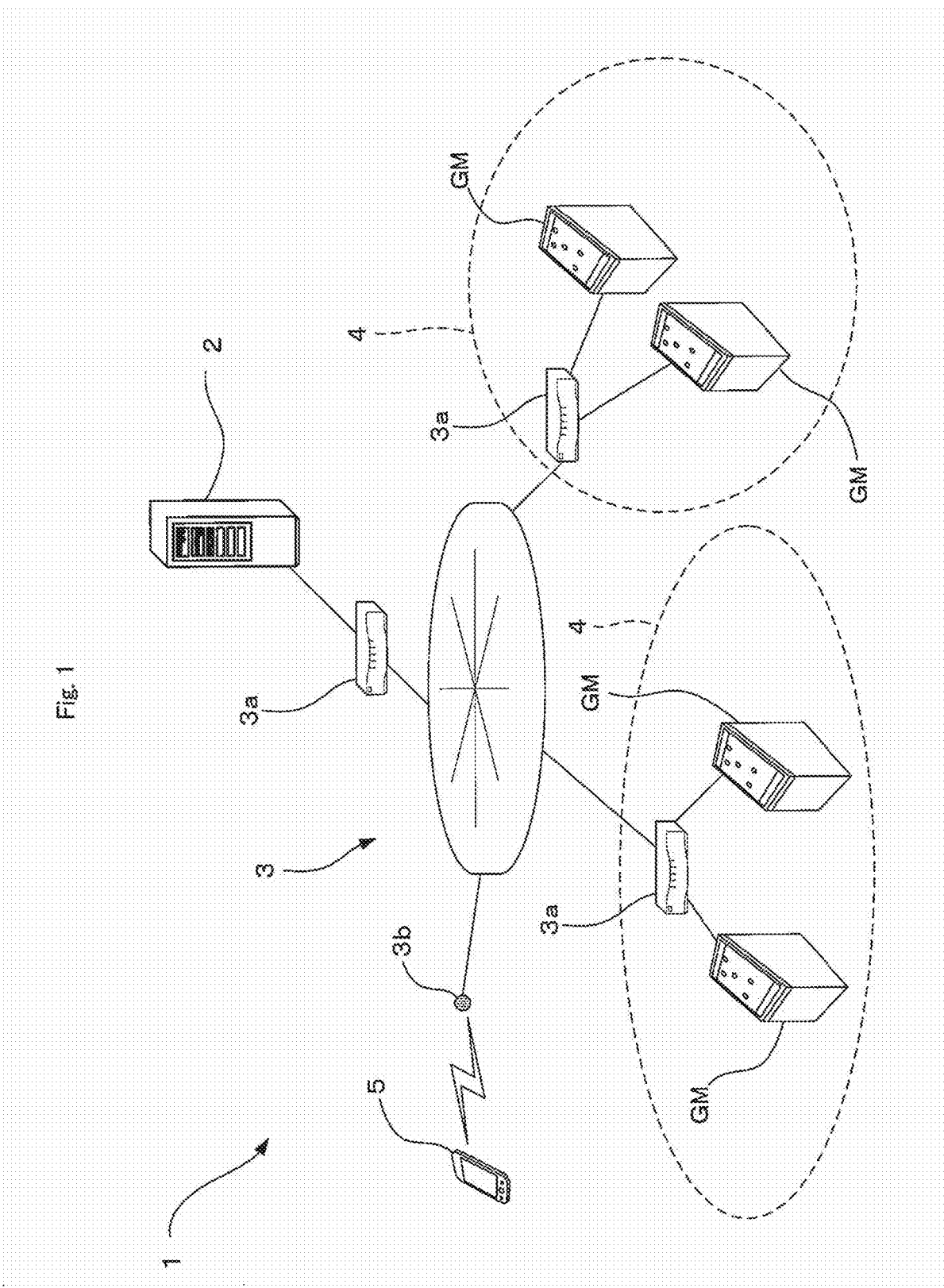
FIG. 1 is a figure showing a summary of the overall structure of a game system according to an embodiment of the present invention.

In the following, a game system according to an embodiment of the present invention will be explained. FIG. 1 is a figure showing a summary of the overall structure of a game system according to an embodiment of the present invention. As shown in FIG. 1, this game system 1 includes a central server 2 and a plurality of game machines GM. The game machines GM are connected to the central server 2 via a network 3. The game machines GM are game machines for business use (i.e. for commercial use) that, in exchange for consumption of a predetermined consideration, allow users (i.e. players) to play a game within a range corresponding to that consideration. As one example, the game machines GM may provide a music game in exchange for consumption of a predetermined consideration. An appropriate number of the game machines GM are installed in a commercial facility such as a shop 4 or the like. The central server 2 is not to be considered as being limited to this example in which it is constituted by a single physical device. For example, it would also be acceptable for a single logical central server 2 to be built as a server group incorporating a plurality of physical devices. Moreover, it would also be acceptable for a logical central server 2 to be built by employing cloud computing. Yet further, it would also be acceptable to arrange for one or more of the game machines GM to function as the central server 2.

Furthermore, the central server 2 is connected to a user terminal 5 via a network 3. This user terminal 5 is a type of network terminal device that implements functions of various types by executing software that is distributed from the central server 2. In the example shown in FIG. 1, a portable telephone (which may be a smart phone) is employed as one example of a user terminal 5. Moreover, apart from the above, for example, a personal computer, a portable type game machine, a so-called portable type tablet terminal device, or network terminal devices of various types that can be connected to the network and that provide personal applications to individual users may be employed as user terminals 5.

As one example, the network 3 may be configured so as to implement network communication by employing the TCP/IP protocol. Typically, the network 3 is built as a combination of an internet such as a WAN and an intranet such as a LAN. In the example shown in FIG. 1, the central server 2 and the game machines GM are connected to the network 3 via routers 3a, and the user terminal 5 is connected via an access point 3b.

It should be understood that the format of the protocol employed by the network 3 is not to be considered as being limited to the TCP/IP protocol format. For the network 3, it would also be acceptable to employ formats of various types that use cable circuits or wireless circuits or the like for communication (including communication via infra-red, near field communication, or the like). Alternatively, it would also be acceptable to implement communication between the user terminal 5 and the game machine GM or the like, not by employing any communication circuit (including cable and wireless), but rather by employing codes (for example two dimensional codes) generated in conformity to a predetermined standard so as to include information of various types. Accordingly, the term "network" (or "communication circuit") is here meant to include a communication method that utilizes a code of this type or the like, or any method of transmitting and receiving information without using a circuit.

The central server 2 provides various types of services for game machines to the game machines GM or to their users. As services for game machines, for example, the services of receiving information for authenticating users from the game machines GM, and of authenticating those users, may be supplied. Moreover, the services may also be supplied of receiving and storing play data of authenticated users from the game machines GM, and of supplying stored play data to the game machines GM. Yet further, a service of distributing and updating programs or data for the game machines GM via the network 3, a matching service of matching users with one another via the network 3 when a plurality of users are playing the same game, and so on may also be included in the services for game machines.

Furthermore, the central server 2 provides web services of various types to the user of the user terminal 5. Web services may include, for example, game information services that provide information of various types related to games that are supplied by the game machine GM. Moreover, web services also include distribution services of distributing data or software of various types to each user terminal 5 (including updating of data and so on). Yet further, apart from the above, web services may also include services such as a community service for provision of a so-called place of exchange for transmission, exchanging, and sharing of information by users, services for assigning user IDs for identifying users, and so on.

Figure 2:
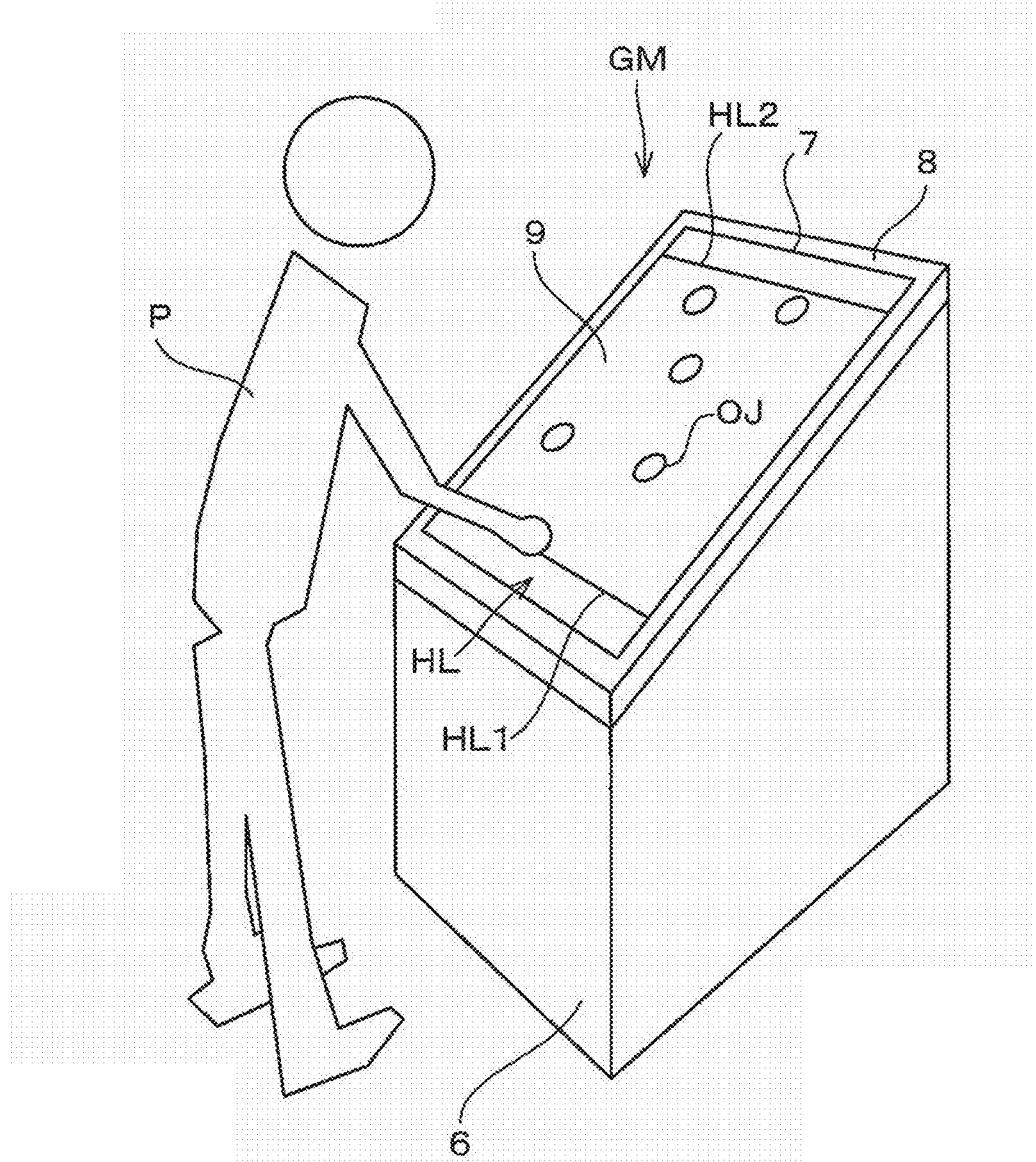
FIG. 2 is a figure showing the external appearance of a game machine.

FIG. 2 is a figure showing the external appearance of one of the game machines GM. As shown in FIG. 2, the game machine GM comprises a casing 6 and a monitor 8 that is disposed on the upper surface of the casing 6, facing slantingly toward a user P. A transparent touch panel 9 is overlaid on the front surface of the monitor 8. This touch panel 9 is a per se known input device that, when touched by the finger or the like of the user P, outputs a signal corresponding to the position of that contact.

Furthermore, as one example, a game screen 7 may be displayed upon the monitor 8. This game screen 7, for example, may include an image OJ of an object and images HL of decision lines. The object image OJ is an image for guiding the timings of appropriate touch operations upon the touch panel 9. The decision line images HL are images that function as destinations for motion of the object image OJ. In concrete terms, the object image OJ provides guidance for appropriate actuation timing by arrival at one of the decision line images HL. Moreover, these decision line images HL include a first decision line image HL1 and a second decision line image HL2. In other words, the object image OJ moves at the timing of user actuations so as to arrive at the first decision line image HL1 or at the second decision line image HL2, and, as soon as it arrives at one of these, an appropriate touch operation is requested as a play action. As one example, this type of game screen 7 may be displayed upon the monitor 8. It should be understood that, in addition to the above, the game machine GM may be provided with input devices and output devices of various types that are equipped to conventional commercial game machines, such as buttons for selection and confirmation, a power supply switch, a volume control switch, a power supply lamp, and so on, but devices of those types are not shown in FIG. 2.

Figure 3:
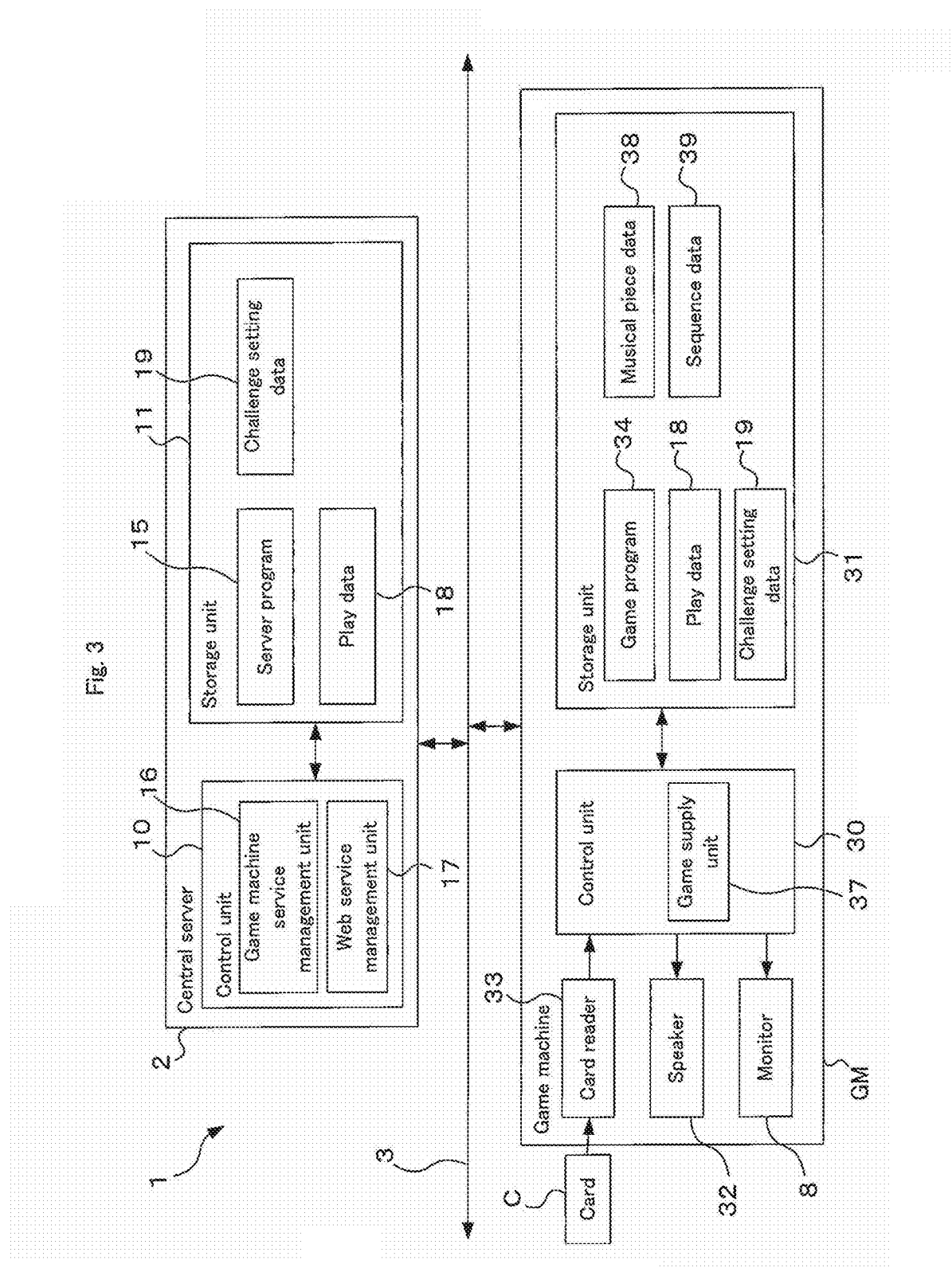
FIG. 3 is a figure showing the structure of principal portions of a control system of the game system.

Next, the principal portions of the control system of this game system 1 for implementing a music game will be explained. FIG. 3 is a figure showing the principal portions of the control system of the game system 1. As shown in FIG. 3, the central server 2 comprises a control unit 10 and a storage unit 11. The control unit 10 is built as a computer unit in which a microprocessor and peripheral devices of various types such as internal storage devices required for the operation of the microprocessor (for example, ROM and RAM) and so on are combined. It should be understood that, while input devices such as a keyboard and so on and output devices such as a monitor and so on, etc., may be connected to the control unit 10, those devices are not shown in the figure.

The storage unit 11 is connected to the control unit 10. The storage unit 11 is built as a high capacity storage medium such as, for example, a magnetic tape or the like, so as to be capable of maintaining storage even without any supply of power. A server program 15 is stored in the storage unit 11. This server program 15 is a computer program that is required in order for the central server 2 to provide services of various types to the game machines GM and to the user terminal 5. By the control unit 10 reading in and executing the server program 15, a game machine service management unit 16 and a web service management unit 17 are provided internally to the control unit 10.

The game service management unit 16 executes processing for supplying the game machine services described above. On the other hand, the web service management unit 17 executes programming that is required for supplying the web services described above. The game machine service management unit 16 and the web service management unit 17 are logical devices that are implemented by combinations of computer hardware and computer programs. It should be understood that, while further logical devices of various types apart from the above may be provided internally to the control unit 10, these are not shown in the figures.

Furthermore, the storage unit 11 also stores data of various types that can be referred to along with execution of the server program 15. For example, ID management data, the play data 18 described above, and challenge setting data 19 may be included in these types of data. The ID management data is data for managing IDs of various types, such as user IDs and so on. The details of the play data 18 and of the challenge setting data 19 will be described hereinafter.

On the other hand, a control unit 30 that serves as a computer, a storage unit 31, a speaker 32, a card reader 33, and a monitor 8 are provided to the game machine GM. The storage unit 31, the speaker 32, the card reader 33, and the monitor 8 are all connected to the control unit 30. The control unit 30 is built as a computer unit in which a microprocessor and peripheral devices of various types such as internal storage devices required for the operation of the microprocessor (for example, ROM and RAM) and so on are combined. It should be understood that, while input devices and/or output devices of various types may be connected to the control unit 30, such as, for example, the touch panel 9 described above or a control panel or a coin authentication device or the like of types applied to other per se known types of game machine, no such devices are not shown in the figure.

The card reader 33 is a per se known device that reads information upon a card C that each of the users possesses, and that outputs a signal corresponding to this information to the control unit 30. A non-volatile storage medium (not shown in the figures) is provided upon the card C, such as, for example, an IC chip or a magnetic stripe. Furthermore, for example, an unique ID or the like (hereinafter, in some cases, termed the "card ID") for each card C or the like may be stored upon the card C. The card ID is used, for example, in order for play data 18 that is stored upon the central server 2 to be retrieved. Moreover, for example, the cards ID may be managed by establishing a one-to-one correspondence or a many-to-one correspondence with a unique ID for each user, via the ID management data described above. And the value consumed as a predetermined consideration during playing of the music game may also be stored in the card ID. Moreover, the predetermined consideration for playing the music game may also be paid via the card C.

Furthermore, the speaker 32 is a per se known audio output device that replays various types of audio on the basis of output signals from the control unit 30. As one example, the speaker 32 may replay audio of various types needed for the music game, such as musical pieces and so on, according to output signals from the control unit 30. In a similar manner, the monitor 8 is also a per se known type of display device for displaying images of various types and the like on the basis of output signals from the control unit 30. As one example, the monitor 8 may display the game screen 7 described above, according to signals outputted by the control unit 30.

On the other hand, the storage unit 31 is capable of maintaining its storage even without supply of any electrical power; for example, it may be built to incorporate a magnetic recording medium, an optical recording medium, a flash SSD (Solid State Drive), or the like. A game program 34 is stored in the storage unit 31. This game program 34 is a computer program that is required in order for the game machine GM to supply the music game. Along with execution of the game program 34, a game supply unit 37 is provided in the interior of the control unit 30. This game supply unit 37 executes processing of various types required for supply of the music game. The game supply unit 37 is a logical device that is implemented by a combination of computer hardware and a computer program. It should be understood that, while further logical devices of various types apart from the above may be provided internally to the control unit 30, these are not shown in the figures.

Furthermore, data of various types is also stored in the storage unit 31 and can be referred to along with execution of the game program 34. Data of this kind includes, for example, the ID management data described above, the play data 18, the challenge setting data 19, musical piece data 38, and sequence data 39. At least portions of the ID management data, the play data 18, and the challenge setting data 19 may, as one example, be supplied from the central server 2, so that necessary portions are included. Like the play data 18 and the challenge setting data 19, the details of the musical piece data 38 and of the sequence data 39 will be described hereinafter. It should be understood that the various types of data described above may include, for example, image data and so on in order for images of various types to be displayed upon the monitor 8, and various types of data, apart from the above, required for providing a music game; but explanation of these is omitted, and they are not shown in the figures.

Next, a game that is supplied by the game machine GM will be explained. A timing game is one example of a game that is supplied by the game machine GM. In this embodiment, a music game will be explained as one example of a timing game. This music game is a game of a type in which guidance is provided to the user as to timings at which appropriate play actions are to be executed as matched to a musical piece, and, when these appropriate play actions have been executed, the timings at which these play actions have been executed are evaluated. As one example, as described above, the game machine GM may provide guidance via the game screen 7 as to the timings at which play actions should be executed. In more concrete terms, in the music game, the user is guided in relation to the timings at which touch operations are to be performed via the object image OJ reaching one of the decision line images HL. And, as one play action, the music game requests a touch operation upon the decision line image HL that the object image OJ reaches. Furthermore, the object image OJ moves so as to shift back and forth between the first decision line image HL1 and the second decision line image HL2. In other words, as one example, the music game is constructed as a music game of a type in which, along with the user being guided as to the operational timings of the touch operations that are to be performed and which decision line image HL is to be touched while the object image moves between the first decision line image HL1 and the second decision line image HL2 in accordance with the music, the positions and timings of these touch operations are evaluated.

Figure 4:
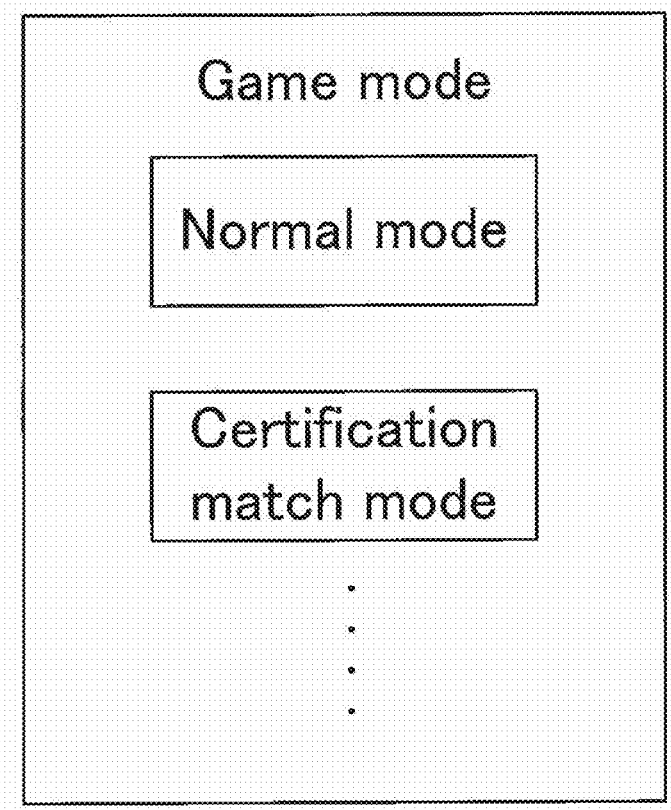
FIG. 4 is an explanatory figure for explanation of examples of game modes of several types that are provided by a music game.

Music games provide game modes of various types. FIG. 4 is an explanatory figure for explanation of examples of game modes of various types provided by this music game. As shown in FIG. 4, these game modes of various types provided by the music game may include, for example, a normal mode and a certification match mode. The normal mode is a mode for competing against a computer or another user via the music game as described above. In normal mode, the main goal is the number of points that can be acquired via this type of competition, or winning or losing as such. On the other hand, the certification match mode is a mode for accrediting (i.e. determining) the skill level of the user (this may also be expressed as the "goodness" or the "level" of the user) at the music game as described above. Accordingly, in the certification match mode, the goal is not the number of points gained or winning or losing itself or the like, but is for one's own skill level to be objectively evaluated; and this is different from the case in the normal mode.

The certification match mode will now be further explained with reference to FIGS. 5 through 7. As one example, the certification match mode may be provided via a certification match, which has been supplied as a challenge supply chance. A certification match means a competition via the music game mentioned above. In a certification match, usually the computer functions as an opponent. And, if certification conditions are satisfied in certification matches, then the users are given "dan levels" that indicates their skill levels. Thus, as one example, any one of a plurality of dan levels from 1-dan to 10-dan may be awarded in a certification match. The dan level awarded to each user corresponds to the dan level that he has successfully attempted.

Figure 5:
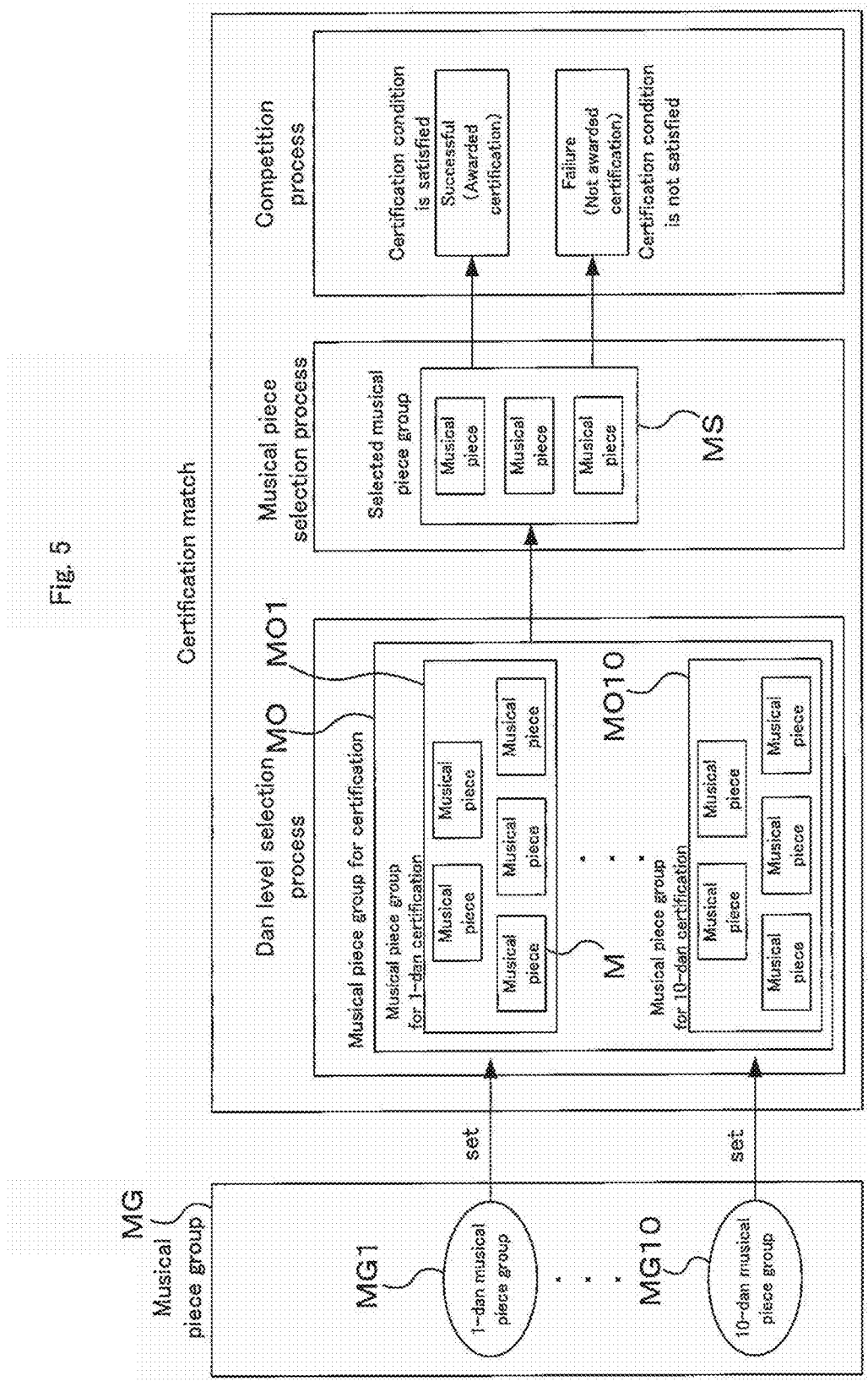
FIG. 5 is an explanatory figure for explanation of an example of flow of a certification match.

FIG. 5 is an explanatory figure for explanation of an example of flow of a certification match. As shown in FIG. 5, a certification match includes a dan level selection process, a musical piece selection process, and a competition process. The dan level selection process is a process for selecting the dan level for the user to challenge. Moreover, along with selection of the dan level to be challenged, a candidate for the musical piece M to be used is designated. Specifically, first, a music game includes a musical piece group MG containing many musical pieces M that can be played as challenges. Furthermore, the musical piece group MG includes a 1-dan musical piece group MG1 through a 10-dan musical piece group MG10. For example, a level of difficulty may be set for each musical piece M of each musical piece group MG. And, as one example, at least some of the musical pieces in the musical piece group MG may be classified into a 1-dan musical piece group MG1 through a 10-dan musical piece group MG10 on the basis of levels of difficulty. It should be understood that, in addition to the level of difficulty, various other types of information may be used for this classification into a 1-dan musical piece group MG1 through a 10-dan musical piece group MG10. For example, as one example of this other information, the season such as spring, summer, and so on, or other periodical information, or administrator setting information or the like may be used.

At least some of the musical pieces M of each of the 1-dan musical piece group MG1 through the 10-dan musical piece group MG10 are set as a musical piece group MO1 for 1-dan certification through a musical piece group MO10 for 10-dan certification. An example of the 1-dan musical piece group MG1 will now be explained in concrete terms. On the basis of classification conditions, at least some of the musical pieces belonging to the 1-dan musical piece group MG1 (for example, five musical pieces) are set as the musical piece group MO1 for 1-dan certification. As an example, the classification conditions may include an initial condition and an updating condition. And, as one example, for the initial condition, a condition for setting an initial musical piece group MO1 for 1-dan certification may be used, while, for the updating condition, a condition for setting a musical piece group MO1 for 1-dan certification after the initial one may be used. In other words, the updating condition is used as a condition for changing the musical pieces M of the musical piece group MO1 for 1-dan certification that were set by the initial condition.

As the initial condition, for example, being a latest musical piece, the frequency of use, or designation by the administrator of the shop 4 or the like may be used. Accordingly, for example, among the 1-dan musical piece group MG1, those musical pieces M that satisfy the criterion of being newest musical pieces or the like may be set as the musical piece group MO1 for 1-dan certification. Furthermore, the 1-dan musical piece group MG1 is set according to the level of difficulty, originally. That is to say, when this is taken into consideration, as one example, the 1-dan musical piece group MG1 is set by taking the initial conditions of the level of difficulty and the newest musical piece and so on as criteria. Furthermore, each one of the musical pieces M making up the 1-dan musical piece group MG1 is changed on the basis of the updating condition. The same is true for the 2-dan musical piece group MG2 and the others.

The musical piece group MO1 for 1-dan certification through the musical piece group MO10 for 10-dan certification correspond respectively to the 1-dan skill level through the 10-dan skill level. In concrete terms, for example, the musical piece group MO1 for 1-dan certification provides musical pieces M that are to be used in certification matches for qualifying at the 1-dan level. In other words, for example, the musical piece group MO1 for 1-dan certification is used in certification matches for users to qualify at the 1-dan level. Accordingly, in the dan level selection process, along with the selection of dan level for challenge, the members of the musical piece group MO for certification at each of these dan levels are designated as candidates for the musical pieces M to be used.

On the other hand, the musical piece selection process is a process for selecting the musical piece M that will actually be used from among the musical piece group MO for certification that corresponds to the dan level of the challenge. In other words, in a certification match, at least some pieces in the musical piece group MO for certification corresponding to the dan level for challenge are selected as one or more musical pieces for use in the match. For example, if the dan level for challenge is the 1-dan level, then, from among the musical pieces M (for example, five pieces) that are included in the musical piece group MO1 for 1-dan certification, at least some of these musical pieces M (for example, three pieces) are selected to be the selected musical piece group MS for use in the match. Moreover, the pieces in this selected musical piece group MS function as some of the "challenges" of the Claims.

The competition process is a process for performing competition for a certified dan level by using the music game. In concrete terms, a competition using the music game is performed with each of the musical pieces M in the selected musical piece group MS. Moreover, in the competition process, as a result of these competitions, it is also determined whether or not the results of the competitions satisfy the certification condition.

As one example, the certification condition may be satisfied if the clear condition is satisfied for a predetermined number of musical pieces M in each competition of the competition process. Furthermore, as one example of the predetermined number, the total number of musical pieces included in the selected musical piece group MS may be employed. In other words, as one example, a competition may be performed every musical piece M making up the selected musical piece group MS, and the certification condition is considered to be satisfied if the clear condition is satisfied in all these competitions. In concrete terms, for example, if the selected musical piece group MS is made up of three musical pieces M, then the music game includes three competitions each of which respectively uses one of the three musical pieces M, and, if the clear condition is satisfied in all of the three competitions, then it is considered that the certification condition is satisfied. It should be understood that the predetermined number is not limited to being the total number of musical pieces. For example, as the predetermined number, it would be acceptable to employ a number of musical pieces corresponding to part of the selected musical piece group MS, such as two pieces or the like. In other words, it will be acceptable if it is considered that the certification condition is satisfied if, for example, the clear condition is satisfied by only a portion of the selected musical piece group MS, such as two pieces out of three pieces, or the like.

As one example, the clear condition may be satisfied when, in a competition using the music game, a score greater than or equal to a predetermined value has been obtained, and moreover the opponent has been beaten. Furthermore, scores in the music game are also given on the basis of appropriate touch operation upon the object images OJ. In other words, the score in the music game may also function as the clearing rate of the appropriate touch operations in the music game (for example, a value equal to the number of objects upon which appropriate touch operation has been performed, divided by the total number of objects that have appeared). And the score in a certification match may be expressed in a different system from the score in the normal mode. In the following, in some cases, the score for each musical piece M when the clear condition is satisfied in a certification match is sometimes termed the "success rate". It should be understood that the clear condition is not limited to this type of form. For example, it would also be acceptable for the clear condition to be satisfied by simply winning in the match. In other words, the score condition may be omitted. Or the converse would also be acceptable (i.e. the win condition may be omitted). Alternatively, if in a certification match the music game only progresses upon the condition of an appropriate touch operation (for example, if the game ends if one inappropriate touch operation is performed), then it would also be acceptable for the clear condition to be satisfied if the music game has been played to the end.

If the certification condition is not satisfied in the competition process, then this is treated as a challenge failure, and the dan level qualification is not awarded to the user. In other words, for example, if the clear condition is not satisfied for at least a portion of the selected musical piece group MS, then the user is not awarded certification at this dan level (i.e. he does not become qualified at this dan level). On the other hand, if the certification condition is satisfied in the competition process, then the dan level corresponding to the dan level that was challenged is certified to the user due to the successful challenge (i.e. the user is awarded certification at this dan level). For example, in the case of a challenge for the 1-dan level, in other words if the musical piece group MO1 for 1-dan certification was selected as the selected musical piece group MS, then the user is awarded certification at the 1-dan level. As an example, a certificated match may be supplied in this manner. It should be understood that a dan level that has once been awarded may not be subsequently reset to be lower. In other words, it will be acceptable for a user's dan level only ever to be raised, but never to be lowered.

On the other hand, as described above, the classification condition includes an updating condition. And the musical piece group MO for certification for each dan level is also established according to the updating condition. In other words, the musical piece group MO for certification for each dan level is changed as appropriate by satisfying the updating condition. As one example, the updating condition may be satisfied if the condition is satisfied that it is determined that each of the musical pieces M is inappropriate for the musical piece group MO for certification for that dan level. To put this in another manner, the appropriateness of the musical piece group MO for certification is determined based upon the updating condition, and the group is appropriately re-evaluated.

Figure 6:
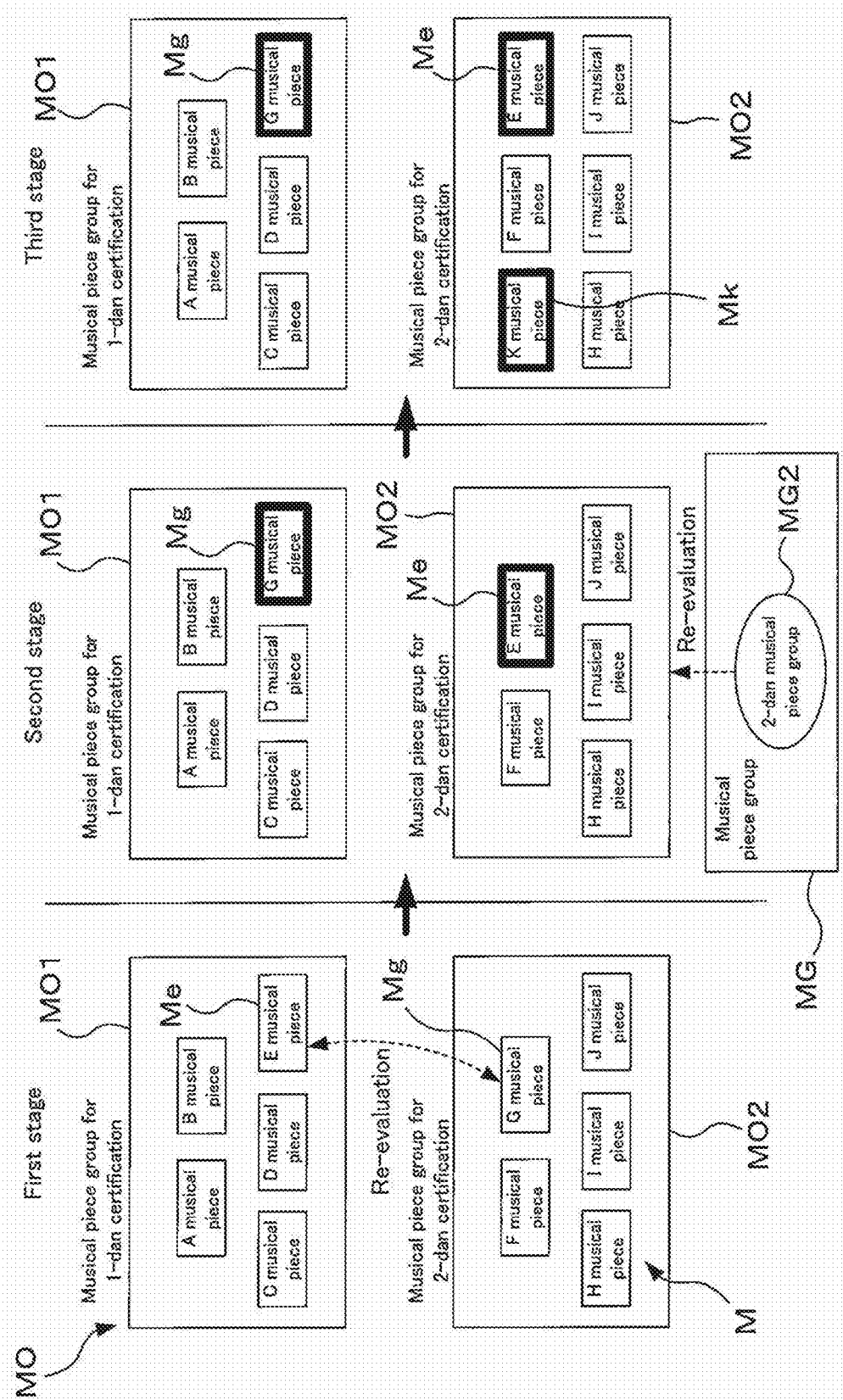
FIG. 6 is an explanatory figure for explanation of an example of re-evaluation of musical piece groups for certification.

FIG. 6 is an explanatory figure for explanation of an example of re-evaluation of the musical piece group MO for certification. As shown in FIG. 6, for example, by replacing a musical piece M of the musical piece group MO1 for 1-dan certification into the musical piece group MO2 for 2-dan certification, and by adding a new musical piece M from a 2-dan musical piece group MG2, musical pieces M are included that are different as regards timing. In other words, due to the re-evaluation, the musical pieces M that are different as regards timing are set into the musical piece group MO2 for 2-dan certification.

In concrete terms, for example, in a first stage, the affiliation of the G musical piece Mg of the musical piece group MO2 for 2-dan certification is re-evaluated. In other words, in this first stage, it is determined that the updating condition is satisfied, and that the affiliation of the G musical piece Mg to the musical piece group MO2 for 2-dan certification is not appropriate. As one example, it may be decided whether or not the G musical piece Mg is appropriate as a musical piece M to continue to be included in the musical piece group MO2 for 2-dan certification, by referring to the proportion at which the G musical piece Mg has been cleared (i.e. to the proportion by which users have succeeded with it), as compared to the other musical pieces M of the musical piece group MO2 for 2-dan certification (i.e. the ratios obtained when the numbers of clears are divided by the numbers of plays), or to the clearing rate for the G musical piece Mg, or the like.

The example of FIG. 6 shows a situation in which, in the first stage, while it is determined on the basis of the clearing rate that the G musical piece Mg is easier than the other musical pieces M of the musical piece group MO2 for 2-dan certification, it is also determined that the E musical piece Me is more difficult than the other musical pieces M of the musical piece group MO1 for 1-dan certification. In this case, the affiliation of the G musical piece Mg and the affiliation of the E musical piece Me are mutually exchanged. In other words, the settings of the musical piece groups MO for certification are re-evaluated, so that the G musical piece Mg becomes affiliated to the musical piece group MO1 for 1-dan certification, while the E musical piece Me becomes affiliated to the musical piece group MO2 for 2-dan certification. And, upon this re-evaluation, the process transitions from the first stage to a second stage.

Then, in the second stage, the musical pieces M that form the musical piece group MO2 for 2-dan certification are re-evaluated again. In concrete terms, a K musical piece Mk that is not as yet set in any musical piece group MO for certification is found to satisfy the updating condition, so that this musical piece is newly added to the musical piece group MO2 for 2-dan certification so that the musical piece group MO2 for 2-dan certification now includes six musical pieces M, and then the process transitions to a third stage. In other words, the number of musical pieces M belonging to the musical piece group MO2 for 2-dan certification changes along with re-evaluation of the musical piece groups MO for certification. In this manner, the number of musical pieces in each of the musical piece groups MO for certification corresponding to each dan level may change due to the re-evaluation.

Furthermore, for example, it would also be possible to employ a condition based upon the clearing rate in the setting of the affiliations of the new musical pieces M of the musical piece group MG as well, in a similar manner to the cases of the musical pieces M whose affiliations have already been set. For example, it is possible to calculate the clearing rates even in the normal mode. Moreover, if the clearing rates of users who have already qualified at a certain dan level are used, then it is also possible to make a comparison with the clearing rates of the musical piece groups MO for certification corresponding to each dan level according to the play results in the normal mode. Therefore, as one example, the affiliation of a new musical piece M may be set with reference to the clearing rates of users who have completed qualification at a certain dan level in the normal mode, so that this musical piece is qualified at a dan level that is determined to be a level equal to that of the musical piece group MO for certification corresponding to this dan level at which these qualifications have been completed. As an example, the affiliation of each musical piece M in the music piece group MO for certification may be re-evaluated in this manner.

Next, a concrete example of the updating condition will be explained. As described above, as one example, whether the affiliation of each musical piece M is appropriate or not may be decided on the basis of its clearing rate. Moreover, further predetermined standards of achievement and reference values may be used in this decision. For example, a reference value may be used for comparison of the magnitude relationship with the clearing rate. Furthermore, for example, a reference value may be set in advance for each dan level or for each musical piece M. In concrete terms, for example, it may be determined whether or not the updating condition is satisfied, on the basis of comparison of the reference value with the actual value of clearing rate. For example, it may be determined that the updating condition is satisfied and that the affiliation is not appropriate when the average value of the clearing rate, or its median value, or its mode value, or the like is remarkably higher (or lower) than a reference value, or the like. Also, whether the average value is remarkable higher or not may, for example, be determined on the basis of a predetermined region. In other words, as one example, it may be determined that the average value is remarkably high or low, according to whether or not the reference value belongs to a predetermined region which is based upon the average value of the clearing rate or the like.

An example of the use of the median value of the clearing rate will now be explained with reference to FIG. 7. FIG. 7 is an explanatory figure for explanation of an example of a case in which the median value of the clearing rate is used in re-evaluation. As shown in FIG. 7, first, the clearing rate distribution is calculated on the basis of the actual clearing rates, which are included in the play data 18 (this will be described in detail hereinafter). Moreover, as one example, the clearing rate distribution may be calculated on the basis of the actual clearing rates in a predetermined range that includes the clearing rate, among the actual clearing rates included in the play data 18, that corresponds to the dan level being re-evaluated. And, for example, whether or not re-evaluation is to be implemented, and the range of such re-evaluation, are determined based upon to which predetermined region the reference value belongs in this clearing rate distribution, as referred to the median value.

In concrete terms, for example, the play data 18 may include 1-dan play data 18a, 2-dan play data 18b, 3-dan play data 18c, and 4-dan play data 18d. For example, the 1-dan play data 18a is data corresponding to users who are attempting the challenges of certification matches for qualifying as 1-dan, in other words who are attempting challenges of certification matches that employ the musical pieces M belonging to the musical piece group MO1 for 1-dan certification. In a similar manner, the 2-dan play data 18b is data corresponding to users who are attempting challenges of certification matches to qualify as 2-dan, the 3-dan play data 18c is data corresponding to users who are attempting challenges of certification matches to qualify as 3-dan, and the 4-dan play data 18d is data corresponding to users who are attempting challenges of certification matches to qualify as 4-dan. It should be understood that, apart from the above, the play data 18 also includes data corresponding to the 5-dan level through to the 10-dan level, but this is omitted from the figure.

And, for example, when each musical piece M belonging to the 2-dan stage, in other words each musical piece M belonging to the musical piece group MO2 for 2-dan certification, is re-evaluated, the actual clearing rate of the 2-dan (a target of the re-evaluation) play data 18b is extracted, and a clearing rate distribution is calculated based thereupon. In other words, as one example, re-evaluation is performed based upon the clearing rate distribution that corresponds to the results of the certification matches at the dan level that is being re-evaluated. It should be understood that the clearing rate extracted from the play data 18 need not be limited to the results of certification matches. For example, for each user who is qualified at some dan level, the actual clearing rate in the normal mode within the predetermined range that includes the dan level to be re-evaluated may be extracted. In more concrete terms, as the predetermined range, for example, ranges that correspond to the dan levels above and below this one may be used with reference to the dan level being re-evaluated. Furthermore, even when the results of certification matches corresponding to the dan level being re-evaluated are employed in the calculation of the clearing rate distribution, it would still be possible for information about the dan level of each user to be employed (for example, their dan levels at the time of playing or of re-evaluation). For example, when performing re-evaluation for the 2-dan level, among the actual certification matches corresponding to the 2-dan level, it would be possible, in the calculation of the clearing rate distribution, to employ only the actual users who hold the dan level corresponding to the dan level that is being re-evaluated (i.e. the 2-dan level) and the dan levels above and below that one (i.e. the 1-dan level and the 3-dan level). In other words it will be acceptable, among the 2-dan play data 18b, for only the actual results of users who belong to the predetermined range to be used for calculating the clearing rate distribution. As one example, the predetermined range that includes the dan level that is being re-evaluated and the dan levels above and below that dan level being re-evaluated functions as the "predetermined range of classifications" of the Claims.

Further, for example, ±5% and ±10% around the median value may be employed as the predetermined region. In concrete terms, for example, based on the median value, if the reference value belongs to the ±5% region around the median value, then it is determined to be appropriate, whereas if it belongs to the region between ±5% and ±10% around the median value, then it is determined not to be appropriate. And if, for example, the reference value belongs to the ±5% region, then re-evaluation is not performed (i.e. the present state is maintained), whereas if the reference value belongs to the ±5% to ±10% region, then re-evaluation by one dan level is performed (for example, in the case of +5% to +10% it is lowered by one dan level, while in the case of 5% to 10% it is raised by one dan level). In a similar manner, if for example the reference value belongs to the ±10% to ±20% region, then re-evaluation by two dan levels may be performed. As one example, the appropriateness (i.e. whether or not the updating condition is satisfied) may be determined on the basis of the actual clearing rate and the reference value, as described above. And a concrete re-evaluation is performed according to these details.

Next, the details of the sequence data 39, the musical piece data 38, the play data 18, and the challenge setting data 19 will be explained. The sequence data 39 is data in which operational timings are described in accordance with the rhythm of the musical piece M such as beat or the like. In more concrete terms, the sequence data 39 is data for displaying each object image OJ upon the path of movement in correspondence to the operational timing, so as to reach one of the decision line images HL at the operational timing. For example, the sequence data 39 may include information items describing the operational timing, the path of movement, and the decision line image HL to be reached. As an example, the sequence data 39 may be configured as a set of records formulated so that these different types of information items are associated with each other.

The musical piece data 38 is data for the control unit 30 to replay musical pieces M via the speaker 32. FIG. 8 is an explanatory figure for explanation of an example of the contents of the musical piece data 38. As shown in FIG. 8, the musical piece data 38 includes a musical piece information section 38a and a musical piece data section 38b. The musical piece information section 38a is used for managing the musical pieces M. And the musical piece data section 38b is used in order for the control unit 30 to replay the musical pieces M via the speaker 32.

In addition, for example, the musical piece information section 38a may include musical piece IDs and level of difficulty information. The musical piece IDs consist of unique ID information for each musical piece M. In other words, each musical piece M is specified by the information in its musical piece ID. Moreover, the level of difficulty information is information specifying the level of difficulty of each musical piece M. Accordingly, as one example, the level of difficulty information is used as a criterion for setting the musical piece group MO for certification described above. And, as one example, the musical piece information section 38a may be set up so that these items of information are mutually associated with one another.

The play data 18 is data for recording the past results of each user. The play data 18 is used, for example, in order for the user to inherit the play results including the previous time of play (i.e. his past record) up to his next and subsequently time of play, or in order for each user to inherit the setting details specific to himself. FIG. 9 is a figure showing an example of the contents of the play data 18. As shown in FIG. 9, the play data 18 may include, for example, user IDs, results data, and dan level information which serves as qualification information. As one example, the play data may be configured as a set of records so arranged that these items of information are in mutual correspondence with one another.

The user ID information item is information specifying a unique ID for each user, as described above. The dan level information is information that specifies the dan level at which the user in question has qualified via certification matches. As this dan level information, for example, a number such as "1" indicating the dan level may be employed. And the results data is data including various types of information related to the user's achievements in the music game.

For example, the results data may include information such as musical piece ID, play date and time, the mode, achievement information, and information about results and so on. The musical piece ID is as described above. The play date and time information is information specifying the date and the time when each of the musical pieces M was played. The mode information is information specifying the mode that was used in playing each of the musical pieces M. In other words, the normal mode or the certification match mode are distinguished by their mode information. For example, this information about the mode is used when extracting the result in a certification match, such as when calculating the clearing rate distribution and so on. Accordingly, the information about the mode may further include information about the dan level that was challenged in each certification match. And the achievement information is information about whether or not how well each musical piece M was achieved. For example, if the achievement is determined by the score as described above, then the achievement information may include information about the clearing rate. And, as one example, when the clearing rate distribution is being calculated, the achievement information may be utilized as information specifying the clearing rate. Furthermore, the information about results is information specifying the play results. The scores are included in the results. Accordingly if, for example, the achievement is determined by the score as described above, then it will be acceptable to arrange for the result to function as a part of the achievement information. As one example, the play data is structured in this manner.

The challenge setting data 19 is data for setting a musical piece group MO for certification for each dan level, such as the musical piece group MO1 for 1-dan certification and so on. In other words, each musical piece M included in the musical piece group MO for certification corresponding to each dan level, such as the musical piece group MO1 for 1-dan certification and so on, is defined by the challenge setting data 19. FIG. 10 is a figure showing an example of the contents of the challenge setting data 19. As shown in FIG. 10, the challenge setting data 19 may include, for example, information for a rank classification ID, for a classification title, and for a musical piece ID. As one example, the challenge setting data 19 may be built as a set of records set up so that these items of information are mutually related to one another.

The rank classification ID information is information specifying a unique ID for each rank classification serving as a classification. This rank classification is a classification for distinguishing each dan level of the musical piece group MO for certification. In concrete terms, for example, classifications corresponding to each rank from 1-dan to 10-dan may be used as rank classifications. And the musical piece group MO for certification for each dan level, such as the musical piece group MO1 for 1-dan certification and so on, is set according to the rank classification that indicates the dan level that is to be used. Accordingly, for each musical piece M making up the musical piece group MO for certification, a rank classification that indicates its dan level is set. As a result, the musical piece group MO for certification at each dan level, such as the musical piece group MO1 for 1-dan certification and so on, is specified by its rank classification ID. The classification title is information that specifies the title for each rank classification. As the classification title, for example, information that specifies the dan level, such as "1-dan" or the like, may be used for distinguishing the musical piece group MO for certification at each dan level, such as the musical piece group MO1 for 1-dan certification and so on. Accordingly, via the classification title, the rank classification also functions as information that specifies the dan level (i.e. the skill level). Moreover, the musical piece ID is as described above. In other words, each musical piece M included in the musical piece group MO for certification at each dan level is defined by the musical piece ID corresponding to the rank classification ID. As one example, the challenge setting data 19 is structured in this manner.

Next, the chance offering processing and the classification change processing will be explained. The chance offering processing is processing for offering to the user a chance for a certification match. On the other hand, the classification change processing is processing for re-evaluating each musical piece M that belongs to each dan-level classification, in other words for re-evaluating each musical piece M belonging to the musical piece group MO for certification, for each dan level. As one example, chance offering processing and classification change processing may be implemented by the control unit 30 of the game machine GM via the routines of FIG. 11 or FIG. 12. Furthermore, as one example, the routines of FIG. 11 and FIG. 12 may be executed via the game supply unit 37 of the control unit 30. It should be noted that, in addition to the processing mentioned above, the control unit 30 of the game machine GM and the control unit 10 of the central server 2 also execute per se known processing of various types and so on, either singly or in mutual cooperation with each other. However, detailed explanation thereof will be omitted.

FIG. 11 is a figure showing an example of a chance offering processing routine flow chart for implementing chance offering processing. For example, the routine of FIG. 11 may be executed each time the certification match mode is selected (if settings of various types are required after selection of the certification match mode, they can be established later).

When the routine of FIG. 11 is started, in a first step S11, the game supply unit 37 offers a chance of a certification match. As one example, as described above, a chance of a certification match includes a dan level selection process, a musical piece selection process, and a competition process (for example, a competition). Accordingly, in a step S11, for example, the game supply unit 37 offers the chance of a certification match that will include each of these processes (as one example, up to the competition of the competition process). In addition, it will also be acceptable for a chance for a certification match further to include a notification of match results for matches in which each musical piece M was used. The match result may, for example, include results as to whether or not the clear condition was satisfied. As described above, as one example, the clear condition may be determined on the basis of the play result (the score, and the victory or defeat result). Accordingly it would also be acceptable, in step S11, for the game supply unit 37 to determine whether or not the clear condition is satisfied on the basis of the play result of each match. And the result of this determination may be notified as a match result.

In the next step S12, the game supply unit 37 determines whether or not the certification condition is satisfied. As mentioned above, as one example, the certification condition is satisfied when the clear condition is satisfied for all of the musical pieces M that are used in the competition. Accordingly, as one example, the determination in the step S12 may be performed as follows. In the step S12, first, the game supply unit 37 acquires the results of competition in the certification matches, in other words acquires information as to whether or not the clear condition has been satisfied in each of the matches. Next, on the basis of these match results, the game supply unit 37 determines whether or not the certification condition has been satisfied. In concrete terms, as one example, the game supply unit 37 may determine that the certification condition has been satisfied if the clear condition was satisfied in all of the matches, and may determine that the certification condition has not been satisfied if, in at least one of the matches, the clear condition was not satisfied. As one example, the game supply unit 37 may make a determination in this manner in the step S12.

If the result of the decision in the step S12 is negative, then the processing of the step S13 is skipped, and the flow of control proceeds to a step S14. On the other hand, if the result of the decision in the step S12 is affirmative, then the game supply unit 37 advances the flow of control to the step S13. In this step S13, the game supply unit 37 attributes, to the user who has challenged, the dan level information corresponding to the dan level at which he challenged in the certification match. In other words, the user who challenged in the certification match is awarded this new dan level. As one example, this award may be implemented by writing dan level information into the play data 18 of the user who challenged in the certification match. In other words, as one example, in the step S13, the game supply unit 37 may update the play data 18 of the user who challenged in the certification match, so that this dan level information is written therein.

Next in the step S14 the game supply unit 37 issues a notification of the result of the certification match. In concrete terms, for example, if the processing of the step S13 has been executed (in other words, if the dan level has been awarded), then in this step S14 the game supply unit 37 issues a notification that the dan level has been awarded as the result of the certification match. On the other hand, for example, if the processing of the step S13 has been skipped and has not been executed (in other words, if the dan level has not been awarded), then in this step S14 the game supply unit 37 issues a notification that, as the result of the certification match, this challenge for this dan level has failed. And, when the processing of this step S14 has been completed, the game supply unit 37 terminates this iteration of the routine. Due to this, certification matches are provided based upon selection of the certification match mode, and also dan levels are awarded according to the results of these matches.

On the other hand, FIG. 12 is a figure showing an example of a classification change processing routine flow chart for implementing the classification change processing. The routine of FIG. 12 is repeatedly executed on, as one example, a predetermined cycle such as once every month or once every two months. Moreover, as one example, the routine of FIG. 12 may be executed for each musical piece M, in units of each musical piece group MO for certification (i.e. in rank classification units) corresponding to each dan level.

When the routine of FIG. 12 is started, first in a step S21 the game supply unit 37 acquires achievement information as result information about the clearing rate of the subject musical piece M. As described above, as one example, this achievement information is included in the play data 18. Accordingly, as one example, the game supply unit 3 may acquire the achievement information in this step S21 by extracting it from the play data 18. Furthermore, as one example, this extraction may be performed by taking, as subject, the clearing rate of the certification matches that correspond to the musical piece group MO for certification corresponding to the rank classification of the subject of processing, in other words to the dan level of the subject. In other words, as one example, in the step S21, the game supply unit 37 may acquire, as achievement information for the subject musical piece M, the portion of the play data 18 that includes the result corresponding to the rank classification to which this musical piece M belongs.

In the next step S22, the game supply unit 37 makes a decision as to whether or not the updating condition is satisfied. For example, whether or not the updating condition is satisfied may be determined based upon the median value of the clearing rate distribution as described above, i.e. according as to whether or not the reference value belongs within a predetermined region. Accordingly, as one example, the determination in the step S22 may be performed as follows. That is to say, the game supply unit 37 calculates the clearing rate distribution of the subject musical piece M on the basis of the achievement information that was acquired in the first step S21. Next the game supply unit 37 determines to which region in the clearing rate distribution the reference value belongs. And then the game supply unit 37 determines whether or not the updating condition is satisfied on the basis of the region to which the reference value belongs. In concrete terms, for example, on the basis of the clearing rate distribution, the game supply unit 37 distinguishes between the case in which the updating condition is not satisfied when the reference value belongs to the region ±5% around the median value, and the case in which the updating condition is satisfied when the reference value belongs to a region more than ±5% away from the median value. As one example, the game supply unit 37 may make the decision of the step S22 in this manner.

If the result of the decision in the step S22 is negative, in other words if the updating condition is not satisfied, then the game supply unit 37 skips the subsequent processing, and this iteration of the routine terminates.

On the other hand, if the result of the decision in the step S22 is affirmative, i.e. if the updating condition is satisfied, then the game providing unit 37 transfers the flow of control to the step S23. In this step S23, the game supply unit 37 changes the rank classification, so that the musical piece group MO for certification to which the subject musical piece M belongs is changed. As one example, re-evaluation may be performed according to the contents of the updating condition which has been satisfied, as described above. Accordingly, the game supply unit 37 performs change on the basis of the result of the determination in the step S23. In concrete terms, for example, if the reference value is within the range of +5% to +10% away from the median value, then the musical piece group MO for certification to which the subject musical piece M belongs is changed so as to lower it by one dan level from the dan level of the subject of processing. Similarly, for example, if the reference value is within the range of 5% to 10% away from the median value, then the musical piece group MO for certification to which the subject musical piece M belongs is changed so as to raise it by one dan level. Furthermore, the musical piece group MO for certification to which each musical piece M belongs is set by the challenge setting data 19. Accordingly, as one example, in the step S23, the game supply unit 37 changes the rank classification to which the subject musical piece M belongs by updating the contents of the challenge setting data 19 so that the affiliation of the subject musical piece M changes.

And, when the processing of the step S23 has been completed, the game supply unit 37 ends the current iteration of this routine. Due to this, the affiliation of each musical piece M is re-evaluated on a predetermined cycle on the basis of the updating conditions, so that each musical piece M included in the musical piece group MO for certification corresponding to each dan level changes.

As explained above, according to this embodiment, the various pieces of music M are divided into rank classifications on the basis of their levels of difficulty, and a chance for playing each piece of music M is given by the rank classification unit (for example, the musical piece group MO1 for 1-dan certification and so on) via a certification match. And the rank classification to which each musical piece M belongs is re-evaluated on a predetermined cycle on the basis of the updating conditions. Due to this, it is possible to set an appropriate rank classification for each musical piece M. As a result it is possible to supply more appropriate musical pieces M which agrees well with the dan levels of challenge, if each of the musical pieces M is used in a certification match by the rank classification unit.

Furthermore, the clearing rate may be used as one example of an updating condition. The clearing rate is highly correlated with the level of difficulty of each musical piece M. Therefore, it is possible to re-evaluate the rank classification of the affiliation of each musical piece M on the basis of information that is more highly correlated with the setting criterion for its rank classification. Due to this, it is possible further to enhance the appropriateness of each rank classification.

Moreover, for example, the result of the clearing rate corresponding to the dan level that is the subject for re-evaluation may be used as the clearing rate. In this case, as a criterion for re-evaluation, it is possible to use the clearing rate of a certification match that is directly related to the rank classification that is the subject for re-evaluation. Or, as the clearing rate, the clearing rate result of each user who holds a dan level qualification in a predetermined range that includes the dan level corresponding to the dan level that is the subject for re-evaluation may be employed. In this case, clearing results for users who, according to the dan level information, have skill levels of equal level to those of certification matches corresponding to the subject dan level are used, even if the clearing results is not the results of certification matches. In other words, in this case, it is possible to re-evaluate the rank classification based upon a clearing rate that is highly correlated with at least the dan level that is the subject for re-evaluation. Due to the above, it is possible further to enhance the appropriateness of the rank classification to which each musical piece M belongs. As a result, it is possible to enhance the interest level of the music game.

In the above embodiment, by executing the routine of FIG. 11 via the game supply unit 37, the control unit 30 of the game machine GM functions as the "chance offering device" and as the "information impartation device" of the Claims. Moreover, by executing the routine of FIG. 12 via the game providing section 37, the control unit 30 of the game machine GM functions as the "result information acquisition device" and as the "classification change device" of the Claims.

The present invention is not to be considered as being limited to the embodiment described above; it could be implemented in various appropriate forms. For example, in the embodiment described above, the clearing rate that was correlated with the subject for re-evaluation was employed as the clearing rate that was used for re-evaluation. However, the present invention is not to be considered as being limited to this format. For example, it would also be acceptable for other conditions to be added, such as: not only being related to the subject for re-evaluation, but also having been used a predetermined number of times or more, or the like. Furthermore, in affiliation re-evaluation, it would also be possible to arrange for musical pieces that have been used for play a specified number of times or more and that are clearly popular to be preferentially subjected to re-evaluation. In music games, the level of interest of the game is greatly influenced, not only by the level of difficulty of musical pieces, but also by whether or not they are popular. In this case, it is possible preferentially to submit, as subjects for re-evaluation, popular musical pieces that enhance the interest level of the music game.

In the embodiments mentioned above, as one example, each of the game machines GM supplies a music game. However, the game supplied by the game machine GM is not to be considered as being limited to being a music game. As long as challenges are included, it will be acceptable for the game machine GM to supply games of various types, such as an action game (in which, for example, it would be possible for a so-called boss character who plays the role of a special enemy to function as a challenge), a role playing game (in which, for example, it would be possible to arrange for a quest or the like of some type in order to acquire specified items to function as a challenge), a simulation game, a shooting game, or the like.

In a similar manner, the game machine GM is not to be considered as being limited to only being a commercial game machine. As the game machine GM, for example, a stationary type game machine for home use (including a stationary type personal computer that is capable of executing a game), a portable type game machine (including a smart phone that is capable of executing a game, a tablet PC, and a portable terminal such as a portable type personal computer and the like) and so on may be employed, as appropriate. Furthermore, in the embodiment described above, the control unit 30 and the storage unit 31 were provided to the game machine GM. However, the game machine of the present invention is not to be considered as being limited to such a form. For example, the control unit 30 and the storage unit 31 may be provided logically on the network by employing cloud computing. In other words, it would be acceptable for the game machine GM to be built as a terminal that provides and displays the results of processing by the control unit 30 via the network 3. Moreover, it would also be possible for the game system of the present invention to be implemented as a single game machine, with the center server 2 being omitted.

In the following, examples of the present invention based upon the details described above are described. It should be understood that, although in the explanation below reference symbols that refer to the attached drawings are included and are written in parentheses in order to make the present invention easier to understand, the present invention is not to be considered as being limited by these reference symbols in any way.

The game system of the present invention is a game system (1) that provides a game in which each challenge (M) for which a level of difficulty is set is prepared as a subject for play, wherein the game system comprises: a chance offering device (30) configured to offer a challenge supply chance of supplying challenges for each classification that is established for each challenge based upon the level of difficulty; a result information acquisition device (30) configured to acquire information (18) about results of playing the challenges for each classification; and a classification change device (30) configured to, based upon the results acquired by the result information acquisition device, change each classification to which each challenge belongs with reference to the results of playing.

According to the present invention, the challenges are divided into classifications based upon their levels of difficulty, and chances are given for playing each of the musical pieces, by units of classification. The classification to which each musical piece belongs is changed according to the results of playing the challenges for each classification. In other words, the category to which each musical piece belongs is re-evaluated on the basis of its record of results. Due to this, it is possible to set an appropriate classification for each musical piece. As a result, it is possible to provide more appropriate musical pieces when each musical piece is being played for each classification. By doing this, it is possible to enhance the level of interest of the game.

And, according to one aspect of the game system of the present invention, when it is determined whether or not it has been possible to achieve each challenge on the basis of a predetermined achievement criterion, then achievement information related to whether or not the achievement has been possible may be employed as the information about the results of playing; and the result information acquisition device may acquire the achievement information as the information about the results of playing. In this case, the category to which each musical piece belongs is re-evaluated on the basis of information related to whether or not each challenge can be achieved. The possibility is high that whether or not the challenge can be achieved is correlated to its level of difficulty. In other words, it is possible to re-evaluate the classification to which each musical piece belongs on the basis of the information that the correlation with the classification standard is high. Due to this, the appropriateness of the classification can be further enhanced.

Information of various types may be employed as the achievement information. For example, according to one aspect of the game system of the present invention, when a result of the game is supplied as a numerical value and a reference value that is set in advance is used as the predetermined achievement criterion, then whether or not the achievement has been possible may be determined on the basis of the magnitude relationship between the reference value and the numerical value, and information about the numerical value may be employed as the achievement information.

The classifications may be employed in various ways. For example, according to one aspect of the game system of the present invention, it will also be acceptable to arrange for each classification to function as information indicating a skill level of each user. Furthermore, in this aspect, it would also be acceptable to employ an aspect in which there is further included an information impartation device (30) configured to, when in the challenge supply chance a certification condition has been satisfied, impart qualification information that specifies the skill level corresponding to each classification to a user who the challenge supply chance has been offered. In this case, it is possible to supply the challenge supply chances as chances of challenges for qualification of the skill levels. Due to this, it is possible to supply musical pieces based upon more appropriate classifications, in the challenge supply chances for qualification of the skill levels.

Moreover, conditions of various types may be employed as the certification condition. For example, in an aspect of the present invention in which qualification information is imparted, it will be acceptable for said certification condition to be satisfied when a predetermined number of challenges in said challenge supply chance have succeeded.

Furthermore, in an aspect of the present invention in which qualification information is imparted, it will be acceptable to arrange for the classification change device, on the basis of the qualification information, to change each classification to which each challenge belongs on the basis of the achievement information of each user of the skill level corresponding to a predetermined range of classifications including a classification to which each challenge belongs. In this case, on the basis of the qualification information, it is possible to employ the results of the users in the predetermined range that includes the classification to be the subject of change, in the re-evaluation of the musical pieces that belong to the various classifications. In other words, it is possible to re-evaluate the classifications to which the musical pieces are affiliated on the basis of the results of users whose relevance to the subject classification is high. Accordingly, it is possible further to enhance the appropriateness of the classifications.

Or, according to another aspect of the game system of the present invention, it will also be acceptable to arrange for the classification change device to change each classification to which each challenge belongs on the basis of the results of playing each challenge during the challenge supply chance. In this case, it is possible to use the results of the challenge supply chance in which various musical pieces are used in each classification for re-evaluating the classification to which each challenge belongs. In other words, it is possible to use the results directly related to the use of the classifications for re-evaluation of the classifications. By doing this, it is possible further to enhance the appropriateness of the classifications.

Challenge supply chances of various types may be provided. For example, according to one aspect of the game system of the present invention, it will also be acceptable to offer the challenge supply chance so as to supply, for each classification, among the challenges (MO) that belong to each classification, at least a part (MS) of the challenges that has been selected by a user to whom the challenge supply chance has been offered.

Games of various types may be provided. For example, according to one aspect of the game system of the present invention, it will also be acceptable to arrange, as the game, to employ a timing game that includes musical pieces corresponding to the challenges, and in which timings of execution of play actions that are executed matched to each of the musical pieces are evaluated.

The control method of the present invention is a control method that causes a computer (30) installed in a game system (1) that provides a game in which each challenge (M) for which a level of difficulty is set is prepared as a subject of play to execute: a chance offering procedure of offering a challenge supply chance of supplying challenges for each classification that is established for each challenge based upon the level of difficulty; a result information acquisition procedure of acquiring information about results of playing the challenges for each classification; and a classification change procedure of, based upon the results acquired by the result information acquisition procedure, changing each classification to which each challenge belongs with reference to the results of playing.

And a non-transitory computer readable storage medium storing a the computer program for a game system according to the present invention is built so as to cause a computer (30) installed in a game system (1) that provides a game in which each challenge (M) for which a level of difficulty is set is prepared as a subject of play to function as: a chance offering device configured to offer a challenge supply chance of supplying challenges for each classification that is established for each challenge based upon the level of difficulty; a result information acquisition device configured to acquire information about results of playing the challenges for each classification; and a classification change device configured to, based upon the results acquired by the result information acquisition device, change each classification to which each challenge belongs with reference to the results of playing. It is possible to implement the game system of the present invention by executing the control method or the computer program of the present invention.

What is claimed is:

1. A game system that provides a game including a plurality of challenges, each challenge for which a level of difficulty is set is prepared as a subject for play, the game system comprising:
   a data storage device that stores setting data including information associated with the plurality of challenges and a plurality of rank classifications, the information including a rank classification associated with each challenge based on the level of difficulty of an associated challenge; and
   a control unit that includes a microprocessor and is connected to the data storage device, the control unit serves as:
   a chance offering device configured to offer a certification match for a desired rank classification, the certification match including at least one challenge for play, the at least one challenge being associated with the desired rank classification;
a result information acquisition device configured to acquire information about results of playing the challenges for each rank classification; and
a classification change device configured to change a corresponding rank classification of a corresponding challenge based on the acquired information about results of playing each of the challenges.

2. The game system according to claim 1, wherein:
when it is determined whether or not it has been possible to achieve each challenge on the basis of a predetermined achievement criterion, then achievement information related to whether or not the achievement has been possible is employed as the information about the results of playing; and
the result information acquisition device acquires the achievement information as the information about the results of playing.

3. The game system according to claim 2, wherein, when a result of the game is supplied as a numerical value and a reference value that is set in advance is used as the predetermined achievement criterion, then whether or not the achievement has been possible is determined on the basis of a magnitude relationship between the reference value and the numerical value, and information about the numerical value is employed as the achievement information.

4. The game system according to claim 2, wherein each classification functions as information indicating a skill level of a respective user.

5. The game system according to claim 4, wherein the control unit further serves as an information impartation device that, when in the certification match a certification condition has been satisfied, imparts qualification information that specifies the skill level corresponding to each classification to a user who the certification match has been offered.

6. The game system according to claim 5, wherein, on the basis of the qualification information, the classification change device changes each classification to which each challenge belongs on the basis of the achievement information of each user of the skill level corresponding to a predetermined range of classifications including a classification of the classifications to which each challenge belongs.

7. The game system according to claim 1, wherein the classification change device changes each classification to which each challenge belongs on the basis of the results of playing each challenge during the certification match.

8. The game system according to claim 1, wherein the certification match is offered so as to supply, for each classification, among the challenges that belong to each classification, at least a part of the challenges that have been selected by a user to whom the certification match has been offered.

9. The game system according to claim 1, wherein, the game is a timing game that includes musical pieces corresponding to the challenges, and in which timings of execution of play actions that are executed matched to each of the musical pieces are evaluated.

10. A control method that causes a computer installed in a game system that provides a game including a plurality of challenges, each challenge for which a level of difficulty is set is prepared as a subject of play, the game system comprising a control unit, the control unit including a microprocessor, the control method including the microprocessor to execute:
a data storage procedure for storing setting data including information associated with the plurality of challenges and a plurality of rank classifications, the information including a rank classification associated with each challenge based on the level of difficulty of an associated challenge;
a chance offering procedure of offering a certification match for a desired rank classification, the certification match including at least one challenge for play, the at least one challenge being associated with the desired rank classification;
a result information acquisition procedure of acquiring information about results of playing the challenges for each rank classification; and
a classification change procedure of changing a corresponding rank classification of a corresponding challenge based on the acquired information about results of playing each of the challenges.

11. A non-transitory computer readable storage medium storing a computer program that is built so as to cause a computer installed in a game system that provides a game including a plurality of challenges, each challenge for which a level of difficulty is set is prepared as a subject of play to function as:
a data storage device that stores setting data including information associated with the plurality of challenges and a plurality of rank classifications, the information including a rank classification associated with each challenge based on the level of difficulty of an associated challenge; and
a control unit that includes a microprocessor and is connected to the data storage device, the control unit serves as:
a chance offering device configured to offer a certification match for a desired rank classification, the certification match including at least one challenge for play, the at least one challenge being associated with the desired rank classification;
a result information acquisition device configured to acquire information about results of playing the challenges for each rank classification; and
a classification change device configured to change a corresponding rank classification of a corresponding challenge based on the acquired information about results of playing each of the challenges.

* * * * *